US011610247B2

(12) United States Patent
Beauchamp

(10) Patent No.: US 11,610,247 B2
(45) Date of Patent: Mar. 21, 2023

(54) METHOD AND SYSTEM FOR RECOMMENDING ITEMS FOR A SURFACE

(71) Applicant: Shopify Inc., Ottawa (CA)

(72) Inventor: Daniel Beauchamp, Huntsville (CA)

(73) Assignee: Shopify Inc., Ottawa (CA)

( * ) Notice: Subject to any disclaimer, the term of this patent is extended or adjusted under 35 U.S.C. 154(b) by 818 days.

(21) Appl. No.: 16/376,018

(22) Filed: Apr. 5, 2019

(65) Prior Publication Data
US 2020/0320607 A1     Oct. 8, 2020

(51) Int. Cl.
*G06Q 30/00* (2012.01)
*G06Q 30/0601* (2023.01)

(52) U.S. Cl.
CPC ..... *G06Q 30/0631* (2013.01); *G06Q 30/0627* (2013.01); *G06Q 30/0641* (2013.01)

(58) Field of Classification Search
USPC ........................................................ 705/26.7
See application file for complete search history.

(56) References Cited

U.S. PATENT DOCUMENTS

| | | | | |
|---|---|---|---|---|
| 10,319,150 B1 * | 6/2019 | Canada | ............... | G06T 19/006 |
| 10,466,092 B1 * | 11/2019 | Shiee | ............... | G01G 19/00 |
| 10,573,019 B1 * | 2/2020 | Anadure | ............... | G06V 10/235 |
| 11,126,845 B1 * | 9/2021 | Chaturvedi | ............... | H04N 5/23218 |
| 2007/0016494 A1 * | 1/2007 | Brown | ............... | G06Q 10/087 |
| | | | | 705/28 |
| 2008/0071559 A1 * | 3/2008 | Arrasvuori | ............... | G06T 19/006 |
| | | | | 705/26.1 |
| 2009/0106124 A1 * | 4/2009 | Yang | ............... | G06Q 10/08 |
| | | | | 705/26.1 |
| 2011/0276364 A1 * | 11/2011 | Bergstrom | ............... | G06Q 10/04 |
| | | | | 705/7.29 |
| 2013/0106910 A1 * | 5/2013 | Sacco | ............... | G06T 19/006 |
| | | | | 345/633 |
| 2014/0344102 A1 * | 11/2014 | Cooper | ............... | G06Q 30/0631 |
| | | | | 705/26.7 |

(Continued)

OTHER PUBLICATIONS

Paul Merrell, Eric Schkufza, Zeyang Li, Maneesh Agrawala, and Vladlen Koltun, Interactive Furniture Layout Using Interior Design Guidelines, Jul. 2011, ACM Trans. Graph. 30, 4, Article 87, pp. 87.1-87.9.) (Year: 2011).*

*Primary Examiner* — Jeffrey A. Smith
*Assistant Examiner* — Brittany E Bargeon
(74) *Attorney, Agent, or Firm* — CPST Intellectual Property Inc.; Brett J. Slaney

(57) ABSTRACT

Computer-implemented methods and systems including receiving at an e-commerce platform a surface data from a customer computing device, where the surface data is related to a physical surface with surface dimensions; selecting with a recommendation engine of the e-commerce platform at least two surface items to be positioned upon the physical surface, the selecting based at least in part on dimensional data of the at least two surface items, wherein at least one of the at least two surface items is a merchant product; determine a quantity of each of the at least two surface items based on the surface dimensions and the dimensional data of the at least two surface items; and communicating a recommendation comprising the quantity of the at least two surface items to the customer computing device.

20 Claims, 8 Drawing Sheets

(56) References Cited

U.S. PATENT DOCUMENTS

| | | | | |
|---|---|---|---|---|
| 2015/0178671 A1* | 6/2015 | Jones | ................... | G06Q 10/087 |
| | | | | 705/28 |
| 2015/0324881 A1* | 11/2015 | Ouimet | ................. | G06Q 30/06 |
| | | | | 705/14.49 |
| 2017/0287044 A1* | 10/2017 | Rose | ..................... | H04L 67/306 |
| 2018/0025315 A1* | 1/2018 | Cortes | ............... | G06Q 30/0635 |
| | | | | 705/26.81 |
| 2018/0225392 A1* | 8/2018 | Jovanovic | ............. | G06T 13/205 |
| 2018/0336732 A1* | 11/2018 | Schuster | ............... | G06T 19/006 |
| 2019/0164134 A1* | 5/2019 | Morrow | ............ | G06Q 30/0282 |
| 2019/0197599 A1* | 6/2019 | Zia | ..................... | G06Q 30/0641 |
| 2020/0104748 A1* | 4/2020 | Zucker | ................ | G06Q 10/087 |
| 2020/0211288 A1* | 7/2020 | Woods | ................... | G06T 19/20 |

\* cited by examiner

FIG. 2

METHOD AND SYSTEM FOR RECOMMENDING ITEMS FOR A SURFACE

FIELD

The present disclosure relates generally to user recommendations in an e-commerce environment, and more particularly to recommendations for items for a surface.

BACKGROUND

Recommendations provided to users of e-commerce are typically based on user characterization, such as on a user's demographic, previous purchases, and the like. However, recommendations are not presently evaluated based on how well items are accommodated on an existing physical surface, such as selecting appropriate items for the surface and determining how many of the items could be accommodated in the available surface area. Therefore, there is a need in the art for computer-based methods and systems that provide e-commerce recommendations for existing physical surfaces.

SUMMARY

In an aspect, a computer-implemented method may include receiving at an e-commerce platform a surface data from a customer computing device, wherein the surface data is related to a physical surface with surface dimensions; selecting with a recommendation engine of the e-commerce platform at least two surface items to be positioned upon the physical surface, the selecting based at least in part on dimensional data of the at least two surface items, wherein at least one of the at least two surface items is a merchant product; determine a quantity of each of the at least two surface items based on the surface dimensions and the dimensional data of the at least two surface items; and communicating a recommendation comprising the quantity of the at least two surface items to the customer computing device. In embodiments, the surface data may include surface dimensions of the physical surface. The surface data may include image data of the physical surface, wherein surface dimensions are derived from the image data. The surface data may include 3D feature data, and further include determining surface dimensions of the physical surface based on the 3D feature data. The recommendation engine may provide selecting based on a product selection criterion received from the customer computing device. The recommendation engine may provide selecting based on a profile of a customer. The recommendation engine may provide selecting based on past purchase history of a customer. The recommendation engine may provide selecting based on merchant product availability. The recommendation engine may provide selecting based on a merchant profile. The at least two surface items may be associated with a customer subscription offer. Determining the quantity of the at least two surface items may be determined through a dimensional layout of the physical surface and how quantities of the at least two surface items fit on the physical surface. Determining the quantity of the at least two surface items may be further determined through layout rules for quantities of objects on a surface and how quantities of the at least two surface items fit on the physical surface. Determining the quantity of the at least two surface items may be further determined through a machine learning algorithm based on layout characteristics for quantities of objects on a surface and how quantities of the at least two surface items fit on the physical surface. Determine at least one of a size or scale for the at least two surface items may be based on the surface dimensions and the dimensional data of the at least two surface items. Generating an illustrative layout of the physical surface may include the determined quantities of the at least two surface items positioned on the physical surface. The illustrative layout may be an image that is determined through use of 3D feature data related to at least one of the physical surface and the at least two surface items.

In an aspect, a system may include an e-commerce platform including at least one processor and at least one memory, the e-commerce platform configured to receive a surface data from a customer computing device, wherein the surface data is related to a physical surface with surface dimensions; select with a recommendation engine at least two surface items to be positioned upon the physical surface, the selecting performed by the e-commerce platform based at least in part on dimensional data of the at least two surface items, wherein at least one of the at least two surface items is a merchant product; determine a quantity of each of the at least two surface items based on the surface dimensions and the dimensional data of the at least two surface items; and communicate the quantity of the at least two surface items to the customer computing device. In embodiments, the surface data may include surface dimensions and a functional use received from the customer computing device. The surface data may include image data of the physical surface, wherein surface dimensions are derived from the image data. The surface data may include image data of the physical surface, and further include determining 3D feature data corresponding to the image data, where the 3D feature data may be utilized in generating aspects of the recommendation. The recommendation engine may provide selecting based on a product selection criterion received from the customer computing device. The recommendation engine may provide selecting based on a profile of a customer. The recommendation engine may provide selecting based on past purchase history of a customer. The recommendation engine may provide selecting based on merchant product availability. The recommendation engine may provide selecting based on a merchant profile. The at least two surface items may be associated with a customer subscription offer. Determining the quantity of the at least two surface items may be determined through a dimensional layout of the physical surface and how quantities of the at least two surface items fit on the physical surface. Determining the quantity of the at least two surface items may be further determined through layout rules for quantities of objects on a surface and how quantities of the at least two surface items fit on the physical surface. Determining the quantity of the at least two surface items may be further determined through a machine learning algorithm based on layout characteristics for quantities of objects on a surface and how quantities of the at least two surface items fit on the physical surface. Processing with the e-commerce platform to determine at least one of a size or scale for the at least two surface items may be based on the surface dimensions and the dimensional data of the at least two surface items. Generating an illustrative layout of the physical surface may include the determined quantities of the at least two surface items positioned on the physical surface. The illustrative layout may be an image that is determined through use of 3D feature data related to at least one of the physical surface and the at least two surface items.

BRIEF DESCRIPTION OF THE FIGURES

FIG. 2 depicts an embodiment of a home page of an administrator.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
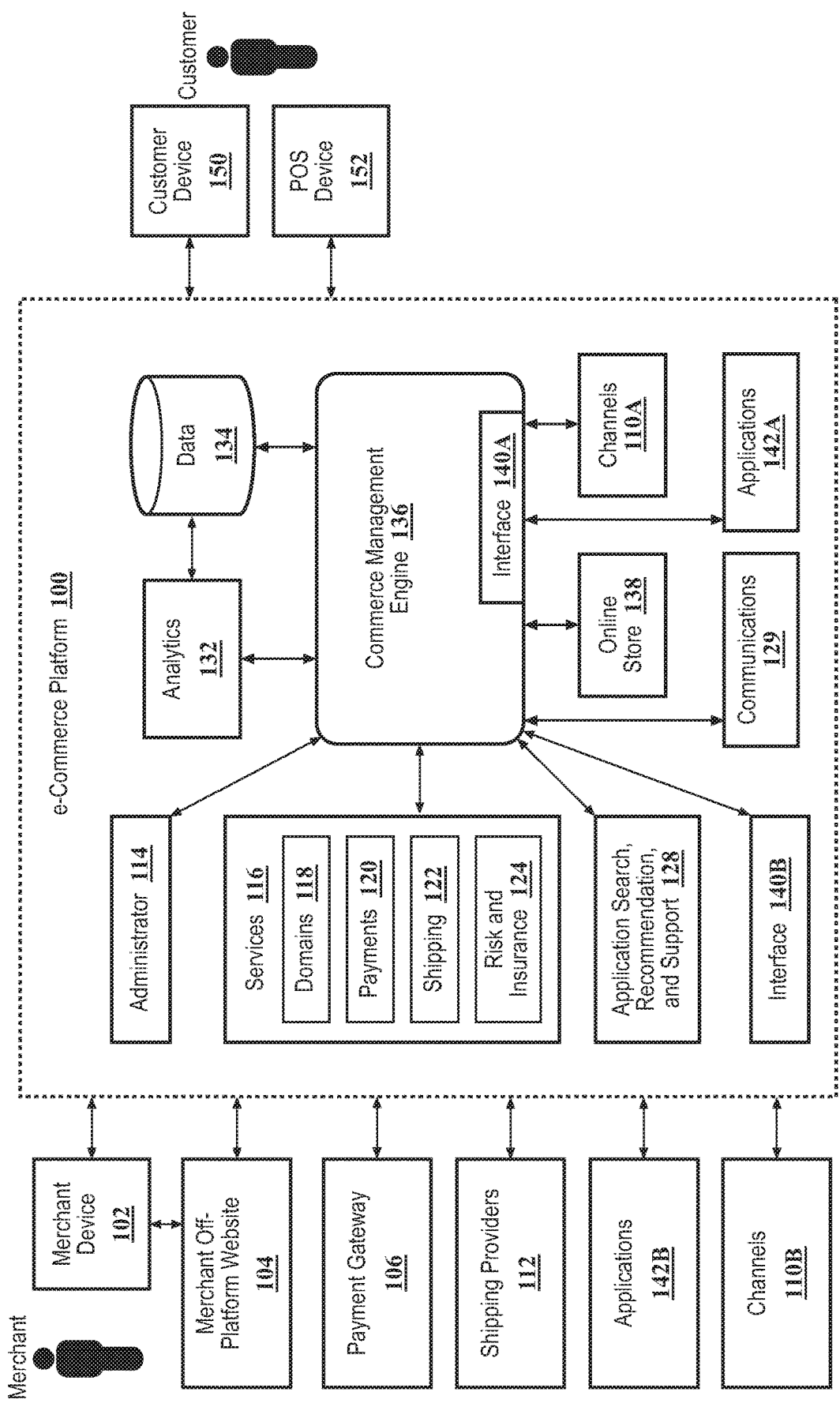
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their web site through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
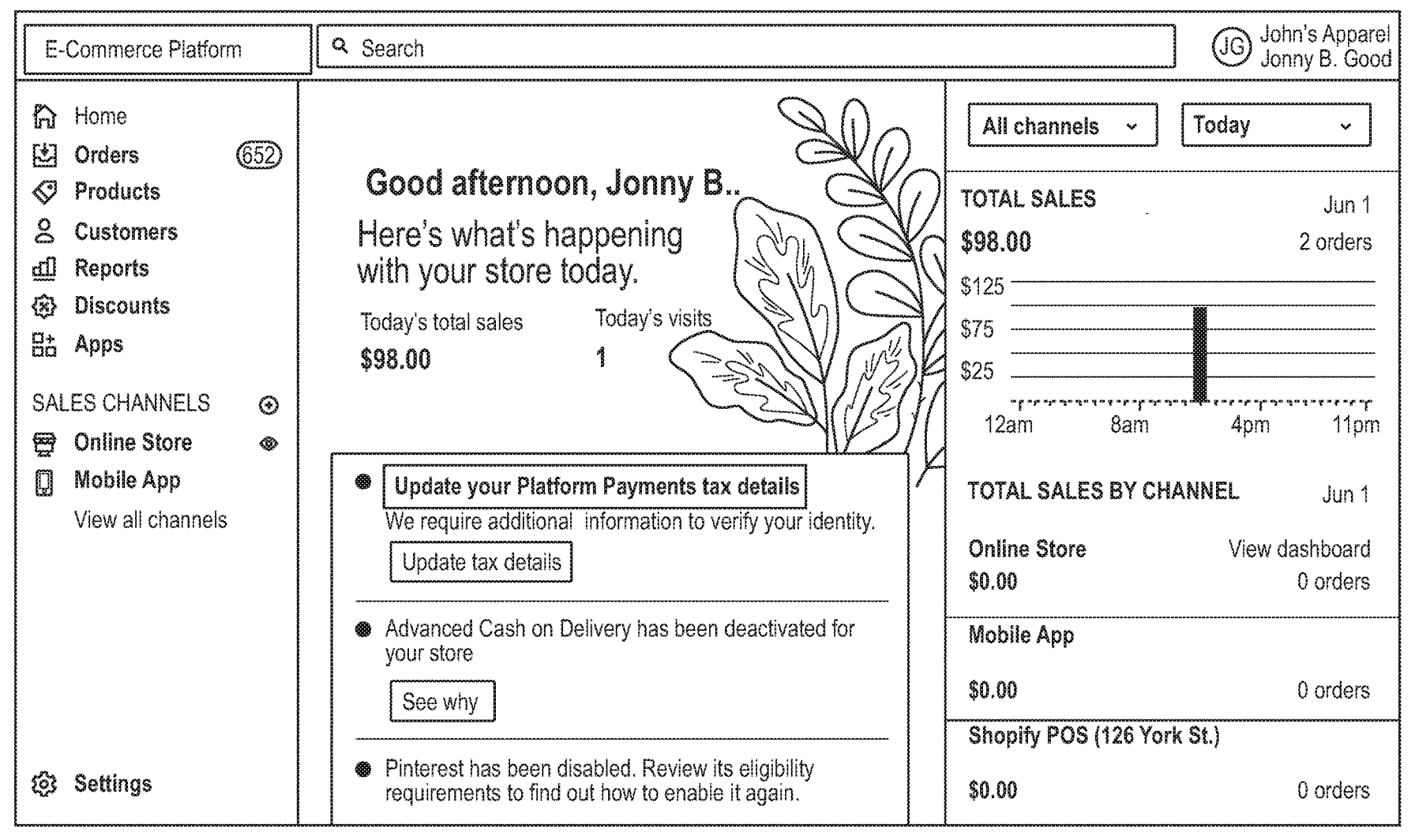

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like). Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

In embodiments, the e-commerce platform 100 may provide recommendations to users, such as to customers, merchants, application developers, and the like, in response to user purchases, sales, communications, channel interactions, application interactions, services, payments, shipping, administration, or any other action taken through the e-commerce platform 100. Recommendations provided to users may enable merchants to improve sales, customers to improve their e-commerce experience, application developers to improve the development of applications that are more responsive to users, and the like. Further, the e-commerce platform 100 may provide users with recommendations specific to certain constraints, such as items for an activity, a facility, a room, a surface of a room, and the like.

Figure 3:
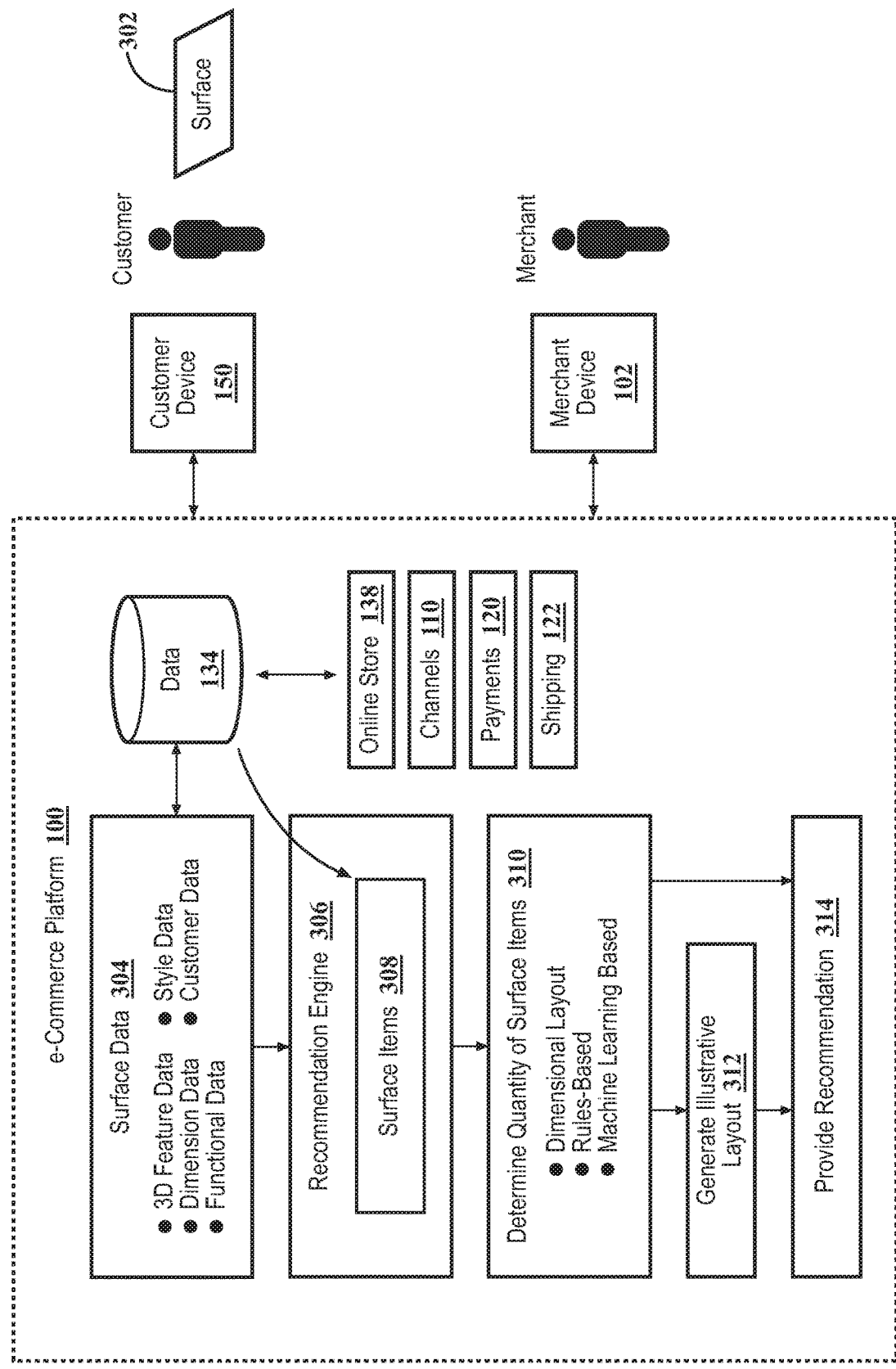
FIG. 3 depicts an embodiment functional block diagram for an e-commerce platform for generating recommendations related to items for a physical surface.

Referring to FIG. 3, the e-commerce platform 100 may include a recommendation engine 306 for making recommendations to customers based on a surface 302 specified by the customer, and for which the customer is interested in surface items 308 for the surface 302. Although the disclosure herein primarily describes a surface 302 as a horizontal surface such as a dining room table, coffee table, office desk, kitchen counter, and the like, more broadly a surface 302 may be any sized or oriented surface, such as the floor of room where surface items are furniture, rugs, lighting, and the like; a vertical surface such as a wall where surface items are decorations, artwork, photos, and the like; the side of an appliance; an outside venue; and the like. Further, while the disclosure throughout contemplates using the apparatus, system, and process disclosed to purchase products and services, for simplicity the description herein will refer to surface items 308 purchased from merchants as products. For instance, a surface item(s) 308 referenced in a recommendation may be a number of dining room place settings for purchase for the surface 302 of a dining room table. Alternatively, the surface item(s) 308 may be part of a service for catering a diner event that includes a number of dining room place settings as surface items 308 for the surface 302 along with setup, cooking, and cleanup services.

In embodiments, the recommendation engine 306 may select and recommend surface items 308 based on surface data 304 of the surface 302, such as the physical dimensions of the surface, shape of the surface, color of the surface, style of the surface, function of the surface, and the like. Surface data 304 of the surface 302 may be provided by inputs from the customer. For instance, the customer may provide the physical dimensions of the surface 302 along with other surface data information, specify a merchant product as a surface 302 (e.g. a table) where a merchant product description includes surface data 304, provide an image of a surface from which the recommendation engine 306 may determine the surface data 304, and the like. The recommendation engine 306 may receive the surface data 304 or product description directly from a customer device 150 or from a data repository (e.g. data facility 134 storing merchant product information) as specified by the customer input (e.g. received from a customer device). From the input or determined surface data 304 the recommendation engine 306 may then identify the surface items 308 as well as determine the quantity of surface items 310 to be provided in a recommendation 314 to the customer. In embodiments, the e-commerce platform 100 may generate an illustrative layout 312 of the recommended surface items 308 on the surface 302 and provide the illustrative layout 312 to the customer as part of providing the recommendation 314.

In embodiments, surface data 304 may be determined from or include 3D feature data of the physical surface, such as may be obtained by a customer with an imaging device (e.g., including a camera and other sensors) utilizing software configured for determining 3D feature data corresponding to one or more items in an image. Such software may be native to a computing device or additive thereto. For example, the software can be used in conjunction with computing devices having a camera and other existing sensors (motion sensor, gyroscope, accelerometer, etc.) in order to define a coordinate system, and to use the defined coordinate system to track changes of the position and orientation of the camera between different acquired images. In such a manner, each acquired image is associated with a corresponding position and orientation of the camera in the defined coordinate system. For example, the software (hereafter also referred to as "AR software") may determine a defined coordinate system (e.g., x, y, z cartesian coordinates) having its origin (0, 0, 0) corresponding to where a computing device camera for acquiring images is located when a first image is acquired. The AR software, in conjunction with sensor data, enables the tracking of a location and an orientation of the camera relative to the defined coordinate system.

Further, the AR software may also determine the existence of planar surfaces or other features for items in or aspects of the captured images. For example, such an AR software tool may exist on a customer computing device and may allow for feature points such as edges to be recognized, such that a planar surface in an image (e.g., a shelf, a table, a rug, a counter, a wall, and the like) can be simply and easily determined. This 3D feature data relating to items in the image is useful for calculating location and orientation of real and virtual objects with respect to the defined coordinate system. This 3D feature data may also be used for recalibrating one image with respect to another, such as where a computing device is located in the customer environment and acquires a second image that needs to be oriented with respect to a first image with the defined coordinate system and origin at a particular location or is moved to a different physical location at a different point in time and needs to be oriented with respect to a coordinate system used at another point in time. The 3D feature data may or may not be communicated to the merchant computing device or to the e-commerce platform. Components of the application using the data from the AR software may be located at various locations, such as at the customer computing device, at the merchant computing device, at a remote server, or at any combinations of these locations and the overall architecture may be peer-to-peer or involve a server or cloud computing resource.

The AR data acquired may include camera position and orientation relative to origin of surfaces that are detected by the software as well as the size and orientation of those detected surfaces. For example, if a customer supplied image depicts a living room with a coffee table, the AR data may include dimensions of the table and orientation of its surface relative to the determined coordinate system. If a customer wants to view an augmented image in the customer environment but using a new image, the AR software is enabled to identify 3D feature points in the new image and line up the new image with respect to the defined coordinate system of the previous image such as by using, at least in part, 3D feature data of the previous image.

In embodiments, prior to the recommendation engine 306 generating a recommendation, 3D feature data may be used in the determination of surface data 304, such as dimensions of the surface, shape of the surface, pre-existing surface items on the surface (e.g., a centerpiece, a runner, magazines, lighting fixtures, photographs, and the like), color of the surface, style of the surface (e.g., rustic, modern, or retro), context of the surrounding environment (e.g., a living room setting, an office setting, or a dining room setting), and the like. Surface data 304 may then be used in generating a recommendation for the surface 302. In embodiments, after the recommendation engine 306 generates a recommendation for surface items 308, 3D feature data may be used to virtually scale and/or position an image of the recommended surface items 308 onto the image of the surface 302 as part of a generated illustrative layout 312 to be provided to the customer in the recommendation. For example, if a product is a table runner it may come in different sizes (e.g., 4 ft or 6 ft) where scaling would provide a means for selecting the correct size. Alternately, the rug may be able to be cut to any size (within a range) and scaled to the appropriate size. Scaling may also apply to other items that come in different sizes, such as dinner plates. For instance, plates may come in 8 in., 10 in., and 12 in. diameter sizes, where scaling may allow for selection of the right size and number of plates for a particular surface (e.g., number of certain sized plates for a given table size). Thus, 3D feature data may enable surface item selection, sizing, placement, and the like, based on the size of the surface. Additionally, 3D feature data may include such item attributes as item type, color, style, and the like, enabling those attributes to be factored into the recommendation selection.

In embodiments, the recommendation engine 306 may determine surface items 308 for the recommendation based, at least in part, on a customer profile (e.g., as provided by the customer, determined from e-commerce data 134, and/or from third-party sources), such as customer personal information (e.g., age, gender, socioeconomic status, and address), historical data (e.g., travels and education), attributes (e.g., residence information and family size), personal preferences (e.g., colors and styles), budget, surface items they already own (e.g., previously purchased surface items that may be used on the surface of the present request), geographic location (e.g., revealing weather or styles associated with the geographic location), surfaces they are interested in new products for, surface data for specific surfaces, and the like.

In embodiments, the recommendation engine 306 may determine surface items 308 for a recommendation for the customer in making the request associated with the surface 302 (e.g., the customer specifying a preference for items, a use case for the items, items they already own, and the like) or based on past behavior, such as based on past purchases (e.g., the customer previously purchased a set of diner plates, a centerpiece, or coffee table book), past purchase behavior (e.g., the customer tends to purchase items with a modernistic style), past responses to recommendations (e.g., likes recommendations related to the dining room but not recommendations related to the home office), and the like.

In embodiments, the recommendation engine 306 may determine surface items 308 for the recommendation from data 134 gathered by the e-commerce platform 100 from general trends based on purchases of other customers through the e-commerce platform 100, the inventory of a merchant, the buying patterns of a plurality of merchants, and the like.

In embodiments, a merchant may include surface items 308 in a recommendation that the merchant sells, that other merchants sell, or a mixture of the two, as well as surface items 308 that the customer already owns or has access to. Merchants may sell products, services, or combinations of the two. For example, a merchant may sell interior design products, interior design services, or a mixture of design services and associated recommended products (e.g., a living room design and/or the furniture, rugs, and artwork for the living room recommended in the design).

In embodiments, surface items may be selected based on a merchant profile, such as including products, product categories, inventory of styles, retail and warehousing locations, shipping carriers, budget, warranty policies, return policies, length of time in business, management team, financial statements, and the like. For instance, a surface item may be selected based on a merchant's current inventory for a product at certain locations (e.g., overstocked on the product).

As described further herein, recommendations may include bundles of products and/or services associated with surface items 308 for a surface 302. For instance, a surface may be a large coffee table at the center of a living space in a home, and the recommendation may include a bundle of surface items as products for the coffee table (e.g., flower vase, cloth runner, and drink coasters) and/or a service for the coffee table (e.g., providing fresh flowers). Further, the recommendation may include a subscription to surface items 308, of which one or more surface items 308 may be provided as a subscription service, such as providing fresh flowers each week/month, delivering new magazines for the coffee table on a subscription basis or selecting a variety of magazines for rotation over a period of time. In embodiments, bundles and/or subscriptions for surface items 308 may be provided based on a theme, season, holiday, sporting event, and the like. For instance, a bundle for the coffee table may include a sports related centerpiece and magazines for the NHL playoffs, such as coordinated to a customer's personal preferences for geographic location or sports affiliation. Similarly, a recommended bundle may be provided for different holidays, birthdays, and the like, such as specified in a customer's profile. Recommendation bundles may also be provided as subscriptions, where each year (or other time period) a new bundle is delivered for specified events, holidays, seasons, or any other specified schedule, interval, and the like, and/or including associated services, such as catering, cooking, cleaning, fresh flowers, magazines, decorations, and the like.

In embodiments, recommendations may include surface items 308 that do not need to be purchased by the customer, but rather are surface items 308 that the customer already has access to (e.g., from previous purchases, listed in a customer's profile, or available local to a customer). For instance, a customer may already own a number of flower vases, where the recommendation suggests a new surface item for purchase (e.g., flowers and/or cloth runner) to go with a vase that the customer already owns. Recommendations may suggest placement of personal items (e.g., memorabilia or family heirlooms). In an example, the recommendation may suggest the purchase of a new sports team cloth covering for the coffee table that would go with a certain vase the customer purchased two years ago, and that the customer place certain sports memorabilia that the customer already owns. Further, the recommendation may include suggestions for flower delivery, catering services, and the like for an upcoming sporting event. In embodiments, this recommendation may be refreshed each year (or other period of time) based on how well the customer's sporting team is doing, where the recommendation engine 306 utilizes information about the customer, the sports team (such as on the team website), past purchases of the customer, past purchases of similar customers, time of year, and the like, to generate bundles and/or subscriptions.

In embodiments, the recommendation engine 306 may access customer information to make customized selections of multiple surface items 308 for the customer, such as based on themes, events, use-cases, and the like. The recommendation engine 306 may access various data sources in making the selection of surface items 308, such as customer information (e.g., from a customer profile, past purchases, past e-commerce behavior, and/or information specified in a communication related to a surface 302), merchant information (e.g., a merchant profile, current inventory, past sales, sales of specific surface items, past e-commerce behavior, and/or past recommendations), e-commerce data associated with other customers, e-commerce data associated with other merchants, news events, social media, environmental data (e.g., the weather, climate, and/or season), and the like. Selection of surface items may be based on characteristics of the surface 302 and surface items 308, such as size (e.g., the size of the surface and the size of each surface item), color (e.g., color palette and/or rules regarding which colors go together and which do not), style (e.g., tied to a time period (e.g., mid-century), category (e.g., modern or traditional), rules for which styles go together and which do not (e.g., a spectrum or score of how well one style fits with another style)), and the like. The recommendation engine 306 may take account preferences listed in a customer's profile with respect to sizes, colors, and styles the customer prefers. The recommendation engine may take account of surface items the customer already possesses, such as mixing and matching suggested new items with items the customer has (or has access to). For instance, the recommendation engine 306 may recommend a different look for a table going from Thanksgiving to Christmas by keeping candleholders the customer already owns (which may have been an expensive purchase) but changing from brown candles to red candles (which may be an inexpensive new purchase), thus providing an economical recommendation to the customer. The recommendation engine 306 may consider or combine items purchased or utilized by merchants and other similar customers in similar circumstances.

In embodiments, the recommendation engine 306 may make recommendations to merchants, such as what surface items 308 to bundle into a recommendation, how to advertise or approach a customer or group of customers with a recommendation, and the like. For instance, the recommendation engine 306 may generate an illustrative layout 312 to go along with the provided recommendation 314 in order to help promote the recommendation. Further, the merchant may choose to include the merchant brand name, logo, brand phrase, and the like, onto the illustrative layout 312 in order to promote the recommendation and/or the brand. For example, the merchant may be a well-known interior designer, and having the brand name on the illustrative layout 312 may improve the likelihood that the customer accepts the recommendation.

In embodiments, the recommendation engine 306 may determine quantities for accommodating surface items 308 on the surface 302 based on the size of the surface 302 and size of the surface items 308 through layouts, a rules engine, artificial intelligence, machine learning and related approaches, and the like, such as when multiple surface items are to be placed on the surface but constrained by the dimensionality of the surface 302 and surface items 308.

Figure 4:
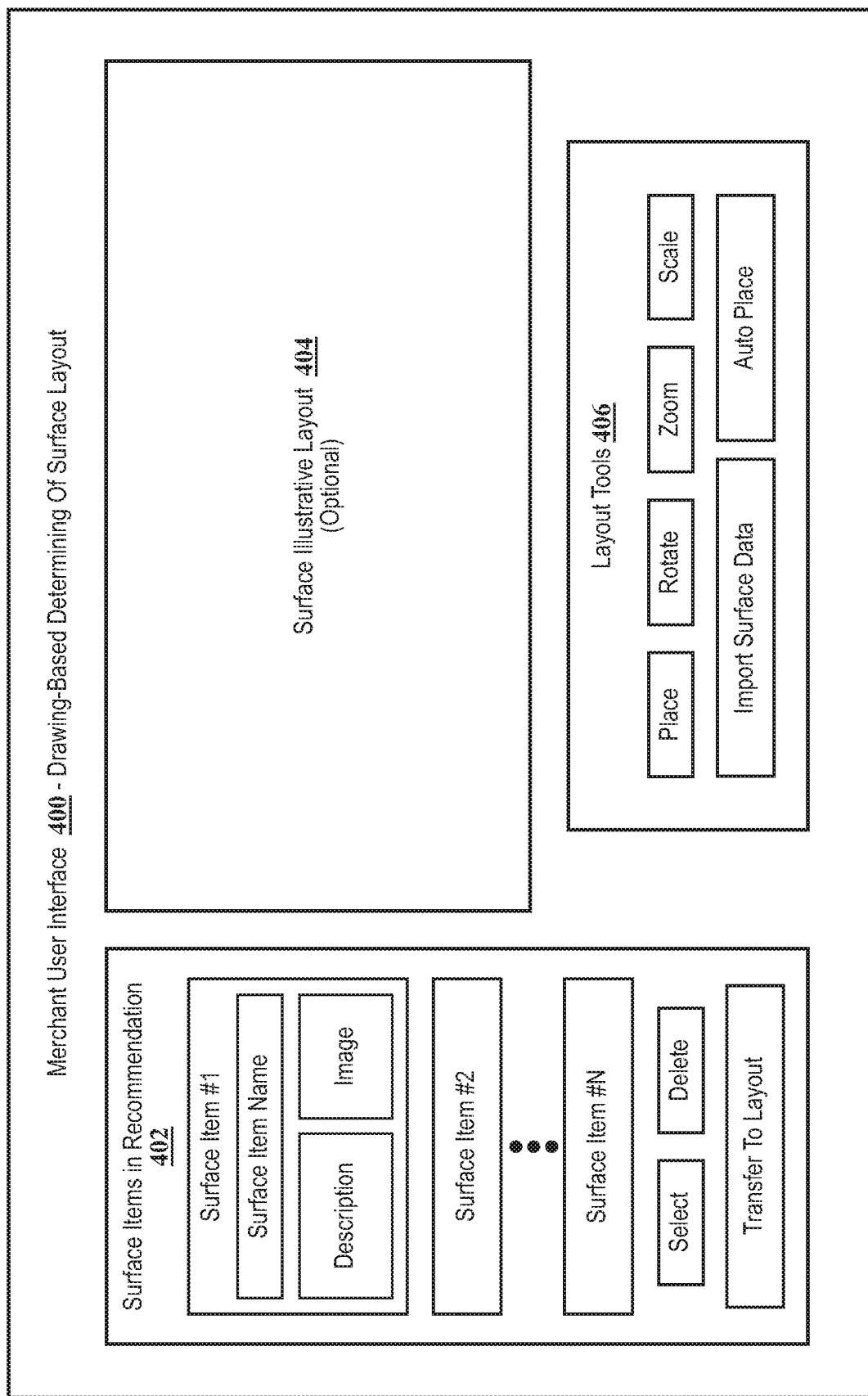
FIG. 4 depicts an embodiment for a merchant user interface for generating a recommendation for a physical surface.

In embodiments, a layout (e.g., a 'blueprint' or other dimensional layout) may be generated by the merchant or other human or machine to determine how the surface items 308 fit together and scale with the dimensions of the surface 302, such as by forming placement or dimensional demarcations along a size spectrum for the surface 302. In an example, a merchant may specify that for a table surface 3 ft wide by 4 ft long there are 4 placemats in a particular orientation, for a table of 3 ft wide by 6 ft long there are 6 placemats in a particular orientation, for a table of 3 ft wide by 8 ft long there are 8 placemats in a particular orientation, and the like. FIG. 4 presents an embodiment user interface 400 to help the merchant manage the process of laying out and/or scaling surface items through a layout, such as including the surface items 402, manipulation tools 406, and a view of the surface illustrative layout 404.

Figure 5:
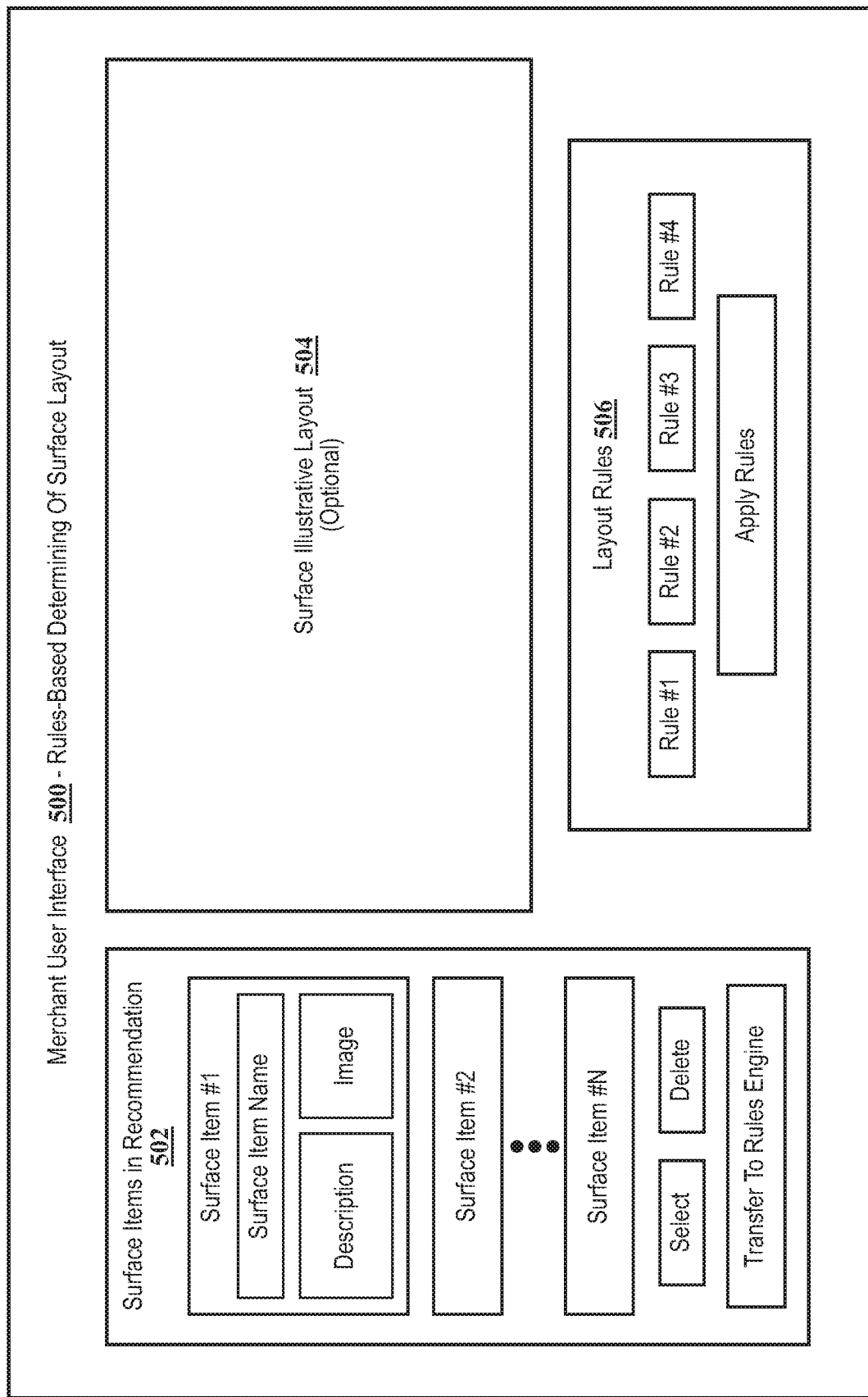
FIG. 5 depicts an embodiment for a merchant user interface for generating a recommendation for a physical surface using a rule-based facility.

In embodiments, the recommendation engine 306 may utilize a rules engine to determine how the surface items 308 fit together and scale with the dimensions of the surface 302, such as where the merchant or other human or machine determines rules that account for an even integer table length and the rules-engine scales the surface 302 and/or the surface items 308 to determine a fit for the surface items 308 to the surface 302. For example, that a table of length 5 ft 8 inches should have 6 placemats, but the placemats should be placed closer together than for a 6 ft long table. In embodiments, a merchant may specify a rule, such as for a standard table width (e.g., 2.5 ft to 4 ft) and that there should be a certain number of placemats per length, such as for instance two placemats per 2 ft length of table oriented opposite each other. In another example a merchant may specify a rule that a particular item (such as a plate) should have a minimum space around it, such as having 1.5 inches of space around it (and also know the size of the item itself). In an embodiment, a rule may specify the relationship between two items, such as an attribute of a first item is equal to an attribute of a second item, multiplied by a multiplier and plus a constant. For example, the rule may be that the leading edge of a fork should be placed 1.1 times the trailing edge of a plate, plus 8 units. In embodiments, a rule may specify a centering relationship with items relative to the surface (e.g., always centered vertically or horizontally relative to an established orientation), equal spacing between items (e.g., space out X amount of placemats to the edges of a table with even spacing between them), operations based on breakpoints (e.g., if the table is above 4' there should be 1 centerpiece, but as soon as it's above 8' there should be two centerpieces), and the like. In embodiments, a rules-based process may need to maintain a discrete or step function with respect to surface items since there can only be a whole number of each item but may be able to vary the spacing between the surface items. In embodiments, some surface items may be continuous, such as a cloth table runner cut to a particular length based on the size of the table. FIG. 5 presents an embodiment user interface 500 to help the merchant manage the process of laying out and/or scaling surface items through a rules-based engine, such as including the surface items 502, rule input or detail 506, and a view of the surface illustrative layout 504.

Figure 6:
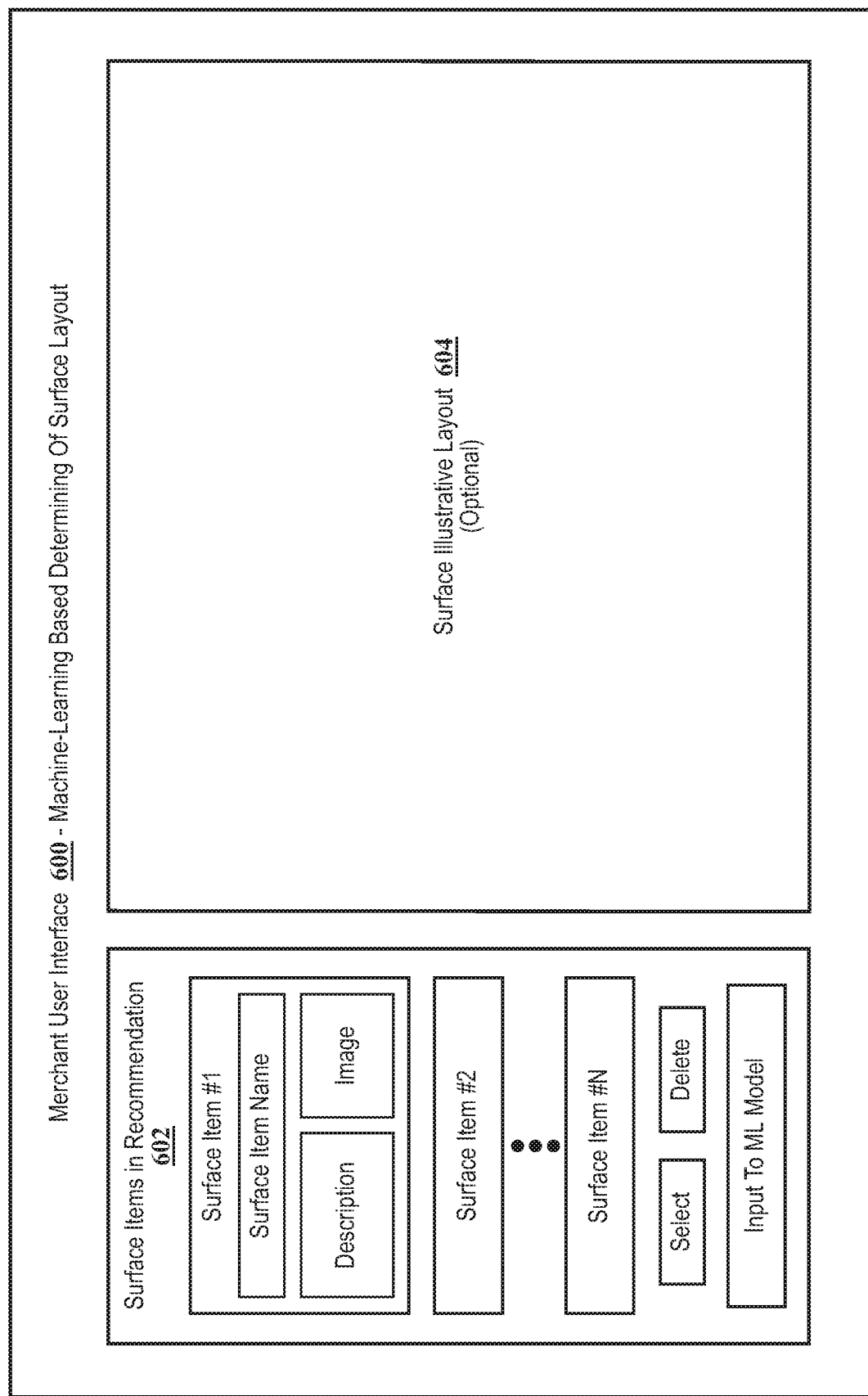
FIG. 6 depicts an embodiment for a merchant user interface for generating a recommendation for a physical surface using a machine-learning facility.

In embodiments, the recommendation engine 306 may utilize artificial intelligence, machine learning and related approaches to determine how the surface items 308 fit together and scale with the dimensions of the surface 302, such as through training machine learning algorithms to specify layouts or rules based on data of surfaces with various configurations of identified and unidentified objects. FIG. 6 presents an embodiment user interface 600 to help the merchant manage the process of laying out and/or scaling surface items through an artificial intelligence, machine learning and related processes, such as including the surface items 602 and a view of the surface illustrative layout 604.

In embodiments, in the above approaches the recommendation engine 306 may utilize algorithms, such as auto layout, responsive design, constraints engine, HTML style Media Queries, and the like, to interpolate and extrapolate configurations for dimensions in between and beyond those specified across a spectrum of dimensional conditions. For example, the use of layouts and rules may account for an even integer table length and the recommendation engine 306 may have to scale to determine that a table of length 5 ft 8 inches should also have 6 placemats, but the placemats should be placed closer together than for a 6 ft long table. The recommendation engine 306 may typically need to maintain a discrete/step function since a requirement may be to maintain a whole number of each item but may vary the spacing between the items. However, some items may be continuous such as a table runner cut to a particular length.

In embodiments, relationships between and among surface items (e.g., determined through layouts, rules engine, or machine learning aspects) may also be determined by the recommendation engine 306 based on the relationships between and among surface items that can impact the spacing between the surfaced items. For example, in setting a dining table the placement of a plate and fork are related and in a given table setting the fork is closer to the plate than the plate is to the plate in the next table setting. In another example, a relationship may specify that certain items are on top of each other, such as bowl on top of plate and plate on top of placemat.

In embodiments, layout and rules (as well as layout and rules attributes) may be applied at the collective configuration level (e.g., surface items being configured onto a surface), or alternately the layout and rules may be stored at the surface item level, such as in a data record for a given surface item. Although the preceding examples primarily describe size as the factor in determining a surface layout, it will be appreciated by one skilled in the art that other surface item attributes may also be factors, such as attributes for color and style, with a fuzzy range for each in the same way that spacing can be varied, where these other surface item attributes may also contribute to a recommended layout.

In embodiments, the recommendation engine 306 may determine a recommendation for surface items 308 on a surface while considering existing surface items identified either directly by the customer (e.g., the customer specifies the existing surface items) or indirectly through determination from 3D feature data. The recommendation engine 306 may first identify the items present on the surface 302 and then determine the size of each object. To accomplish this, the recommendation engine 306 may utilize, for instance, artificial intelligence, machine learning, related approaches and/or comparison techniques with libraries of images of exiting objects. The recommendation engine may use information relating to the context (e.g., determined from the surface or environment of the surface in an image provided by the customer) to assist with identification and/or narrowing the available choices. For example, if the context is a dining table, the recommendation engine 306 may be able to limit the library of items to those items typically found on a dining room table. Then the recommendation engine 306 may determine that round-thin items are plates and matches to images in library for plates. 3D feature data may then be used to determine the size of the plate and incorporate that plate into the recommendation bundle.

Figure 7:
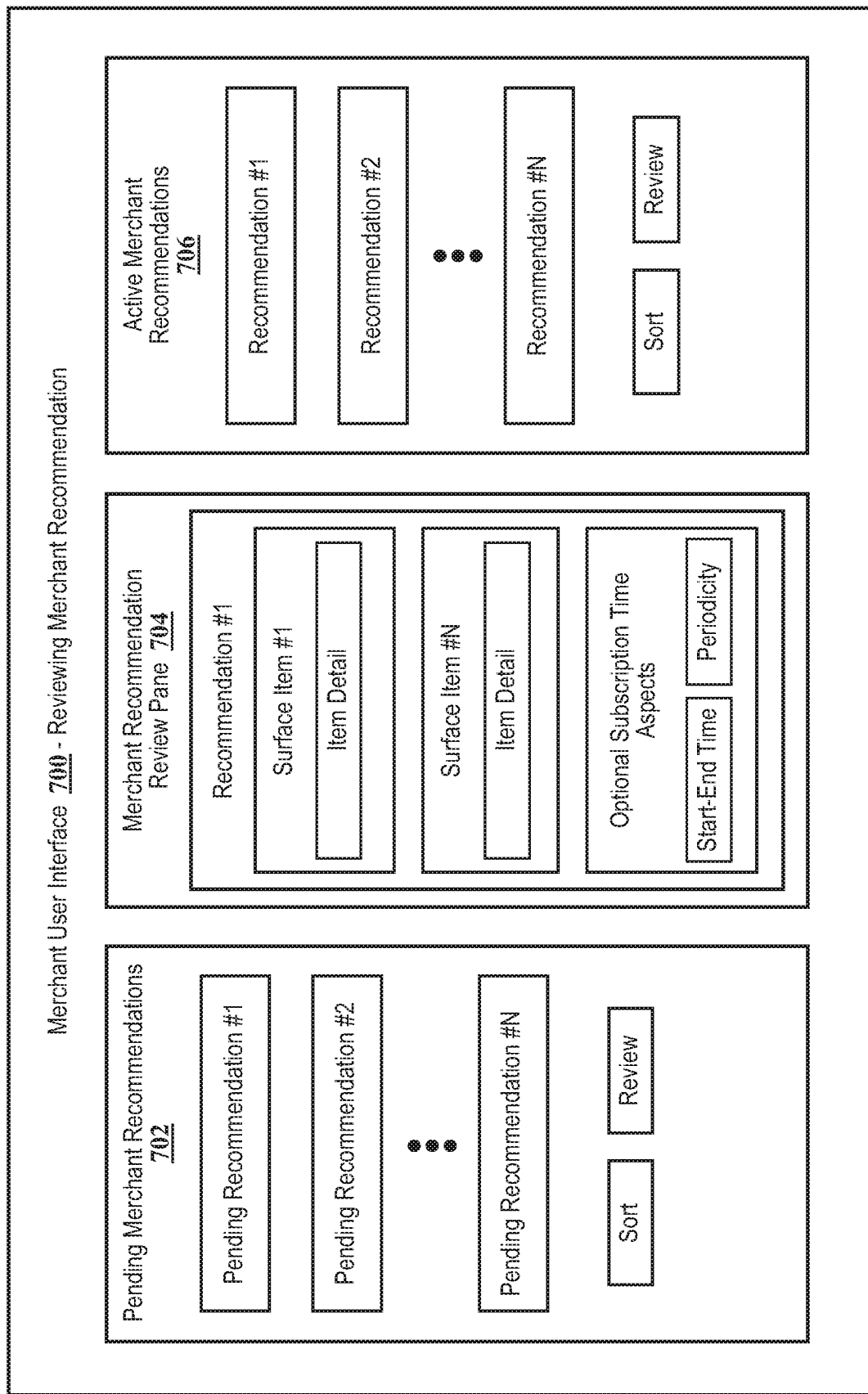
FIG. 7 depicts an embodiment for a merchant user interface for a merchant generating and reviewing recommendations.

In embodiments, a user interface may be provided to aid the merchant in selecting and arranging surface items 308 onto a surface 302, where surface items 308 may be associated for potential inclusion in a recommendation bundle. For example, the user interface may aid in the process of specifying relationships between surface items (e.g., between plates, forks, knives, spoons, placemats, and glasses as related to create a place setting, and each place setting contributing to the layout of multiple place settings around a dining room table). Referring to FIG. 7, a merchant user interface 700 may be provided for reviewing merchant recommendations, such as viewed on a merchant device 102. In embodiments, the user interface 700 may provide display portions including a list of pending merchant recommendations 702 such as still under development or review prior to being provided to a customer (e.g., including control functions such as sort and review for manipulation of the pending merchant recommendations), a merchant recommendation review pane 704 (e.g., including details of a selected recommendation), a list of active merchant recommendations 706 such as previously provided to customers (e.g., including control functions such as sort and review for manipulation of the pending merchant recommendations), and the like. In embodiments, the merchant recommendation review pane 704 may include details of each surface item included in the recommendation, such as a surface item name, description, image, specifications, and the like. In the instance when a recommendation includes aspects of a customer subscription, such as when one or more surface items is to be included in a subscription to the customer, control functions for subscription time aspects may be provided (e.g., a subscription start date, a subscription end date, a periodicity of the subscription, and the like).

Figure 8:
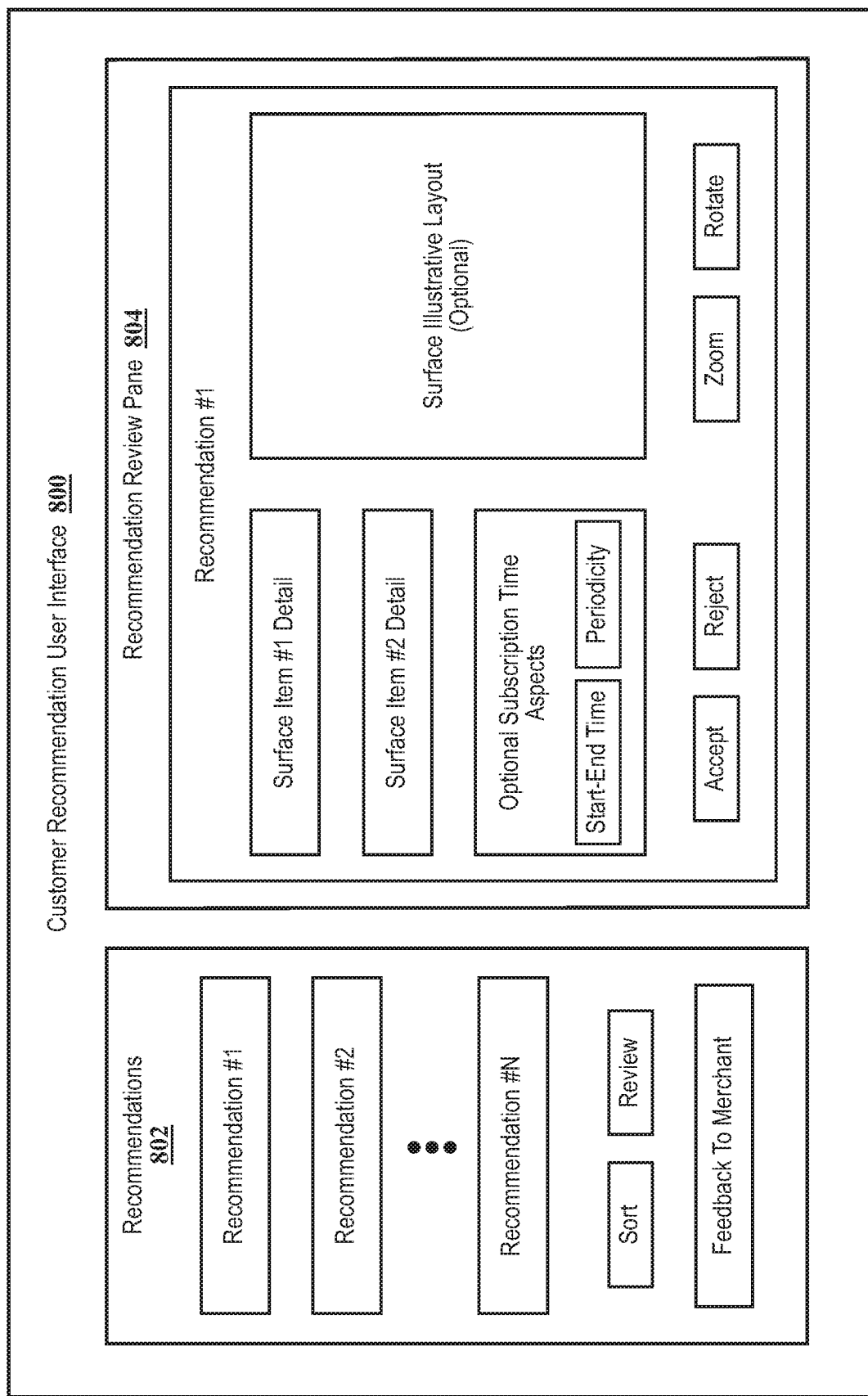
FIG. 8 depicts an embodiment for a customer user interface for reviewing a recommendation for items on a physical surface.

Referring to FIG. 8, a customer user interface 800 may be provided for reviewing recommendations provided to customers, such as viewed on a customer device 150. In embodiments, the user interface 800 may provide display portions including a list of available customer recommendations 802 (e.g., including control functions such as sort and review for manipulation of the recommendations), a customer recommendation review pane 804 including details of a selected recommendation, and the like. In embodiments, details provided through the customer recommendation review pane 804 may include a list of surface items included in the recommendation (e.g., surface item name, description, image, and/or specifications), details of subscription details (e.g., a subscription start date, a subscription end date, and/or a periodicity of the subscription), and the like. In embodiments, a recommendation may include a surface illustrative layout, such as showing the surface 302 and surface items 308 presented on the surface (e.g., as enabled through use of 3D feature data). Control functions may be provided to manipulate the surface illustrative layout, such as including zoom, rotate, and the like functions. In embodiments, a control function may be included to enable the customer to provide feedback to the merchant. For instance, a customer may like certain aspects of a given recommendation and communicate that to the merchant, who may then modify the recommendation to the preferences of the customer and/or otherwise learn from the feedback.

Although the preceding examples primarily relate to a surface 302 as a horizontal surface such as a table, a surface may more generally be any surface in any orientation. For instance, a surface 302 may be the floor of a room, a wall of a room, an outdoor patio, and the like. For example, if the surface 302 is a wall the recommendation engine 306 may need to take into account doors, windows, light sources, and the like, and the placement of artwork and shelving on the wall would need to be considered in the layout configuration. If the surface 302 is a floor of a room the surface items 308 to be determined in the recommendation bundle may be furniture (e.g., couch, loveseat, coffee table, side tables, and the like), and the recommendation engine 306 may need to consider spacing between the furniture in the layout configuration.

In embodiments, recommendations may include information related to the surface items 308 such as products (e.g., one or more products from a merchant or group of merchants), information about merchants (e.g., a merchant name, logo, tag line, or geographic location as part of communications to the customer, or agreements between merchants and the like), guarantees (e.g., guarantee agreements between merchants, guarantee agreements between the e-commerce platform and a merchant(s), and the like), or other information related to the generation of recommendation bundles and/or subscriptions. Subscription features 308 may include different subscription dimensions, such as products for the subscription, frequency of delivery for the products of the subscription (e.g., once per month, once per season, once per year, and the like), duration of the subscription (e.g., the subscription lasts for six months, one year, or until turned off by the customer), and the like. Determining subscriptions based on individual customer behavior may increase the probability that a subscription offer will be successful, which has benefits to both the merchant and to the customer.

In embodiments, the e-commerce platform 100 may collect e-commerce data from a data facility 134, such as from interactions with customers (e.g., prior purchase data, such as associated with a customer purchase parameter) and merchants (e.g., prior sales data, such as associated with a merchant purchase parameter, merchant buying data, product transactions, and the like), such as through data transfers associated with a customer device 150, a POS device 152, a merchant device 102, the online store 138, channels 110, payments 120, shipping 122, and the like. E-commerce data from the data facility 134 may be utilized by the analytics engine 132 to determine e-commerce behavior data 402 associated with customer purchase data 404 (e.g., products purchased, products placed in a virtual shopping cart but not purchased, or products browsed (e.g., in an on-line store 138 or on a merchant off-platform website 104)), merchant e-commerce behavior data 406 (e.g., products sold, products purchased, product inventory, or products listed in a catalog) and the like, to determine an analytic 408 (e.g., subscription product, purchase pattern, commerce category, and the like) through which a recommendation may be generated. For simplicity references to subscriptions throughout this disclosure should also be understood to be references to subscriptions of one product or to more than one product (where a subscription of more than one product may also be referred to herein as a bundle), subscriptions from one merchant or that span products from more than one merchant, subscriptions that are a one-time event/purchase or with a given frequency over a given period of time, and the like.

In embodiments, the e-commerce platform 100 may generate recommendations based on detected commerce behavior patterns (e.g., user purchases or tracking a product), such as presented to a merchant, group of merchants, consumer, group of consumers, and the like. For instance, the analytics engine 132 may evaluate e-commerce data (e.g., purchase behavior data of a customer, merchant commerce data of a merchant, and the like) as retrieved from the data facility 134, and generate a recommendation based on a threshold value for a product characteristic (e.g., number of products purchased, sold, in inventory, and the like), a pattern detected in the e-commerce data (e.g., customer or merchant commerce behavior associated with product sales), a customer or merchant characteristic (e.g., trends in behavior), a commerce category (e.g., a room or activity space in a home or business), and the like, where a recommendation may be presented to the merchant as a recommendation to offer to a customer, group of customers or generally. In an example, the analytics engine 132 may process e-commerce data received from the data facility 134 based on setting a threshold value for an e-commerce attribute related to products for sale by the merchant (e.g., number of times the customer has purchased the at least one product, number of the at least one product currently in inventory for the merchant, number of the at least one product that is sold by the merchant, number of the at least one product sold across the e-commerce platform, and the like), where processing the e-commerce data with an analytics engine 132 determines a present value for the e-commerce attribute of at least one product, where if the present value exceeds the threshold value then a subscription offer is generated for the at least one product, where the recommendation may include a cost discount value, sales schedule, and the like for the at least one product as offered from the merchant to the customer. The recommendation may then be transmitted and presented to the merchant (e.g., presented through a merchant user interface e.g. in the administrator 114), such as for the merchant to offer the recommendation to the customer, based on a recommendation approval attribute set by the merchant (e.g., a merchant approving, enabling, editing, and the like, the recommendation), and the like.

In embodiments the analytics engine 132 may identify products that are being purchased, such as through commerce purchases (e.g., language processing of product names and/or descriptions, or vision system processing of images associated with the purchase), communications (e.g., language processing of customer communications related to product discussions or language processing of merchant communications related to retail product sales or wholesale product purchases), and the like. The analytics engine 132 may constantly evaluate and identify products for potential recommendations, such as based on evaluation of purchase patterns for a plurality of merchants and/or customers, a specific merchant or group of merchants, a specific customer or group of customers, or any combination of general merchant and/or customers and specific merchant and/or specific merchants. Further, the analytics engine 132 may identify generic products or product types, classes or categories from specific brand products (e.g. a product type) is being regularly purchased in general vs. a specific brand. In embodiments, the analytics engine 132 may then incorporate that information into recommendations (e.g., offering a customer or group of customers a choice of brands or a specific brand, depending on the goals of the merchant related to targeted brands and product bundling). In embodiments the analytics engine 132 may evaluate historical purchase patterns across customers and/or merchants to determine if they have a purchase pattern for an identified product (or type of product) that may be accommodated through a recommendation. For instance, if the analytics engine 132 identifies a product being purchased, and determines based on historical purchase data across customers and/or merchants that the product is a type of product suitable for purchase, the analytics engine 132 may present a merchant with a recommendation to offer it in a bundle or on a subscription basis. In another embodiment, if the analytics engine 132 identifies a product being purchased, and determines that a specific customer has historical purchase patterns that reveal the customer purchases once every two months on average, the analytics engine 132 may present a merchant with a recommendation to offer that customer a subscription offer as part of the recommendation. In another embodiment, the analytics engine 132 may first evaluate a plurality of customer and/or merchant purchase patterns to identify potential products (or product types) for inclusion in a recommendation, and then evaluate a specific customer or merchant (or specific group of customers and/or merchants) to determine if the identified products apply to the specific customer(s) and/or merchant(s). In this way, the analytics engine 132 may create recommendations based on data across a broad number of users as well as on the specific purchasing patterns of an individual or group of individuals. Further, the analytics engine 132 may associate products with related products through relational processing. For instance, if the analytics engine 132 determines the product is a particular type or brand of product, relational processing may determine that customers often also purchase related products, and that the product and the related product may be bundled together in a recommendation (e.g., along with other like products). The analytics engine 132 may generate recommendations for bundles of products or subscriptions in general corresponding to categories or in association with particular products or may review historical purchase patterns for a given customer to determine if the customer has a purchase pattern for the related products, and if so recommend to the merchant to offer the product and related product(s) in a bundle or subscription offer to the customer (e.g., a product and related product in a bundle, or through a subscription with periodicity determined from the historical purchase patterns of one or both products).

With respect to subscription offers, offering subscriptions to customers may not only benefit the customer (e.g., discounted rates and/or saving time spent in re-orders of regularly purchased products) but may also reduce a processing burden on the merchant. For instance, subscriptions may reduce resources expended on marketing to repeat customers, as the repeat customers now have a mechanism to automatically re-order products. In another instance, the merchant may reduce resources expended in shipping products, such as through combining products in one shipment, shipping similar products or bundles of products to a group of customers on a periodic basis, and the like. For example, the subscription offer recommendation may optimize the shipment of a product to a group of customers based on historical purchase patterns for the group of customers such that the merchant minimizes the time spent on packaging and shipping the product to the group of customers, thus reducing resources expended for this activity. In this way, subscription offer recommendations may not only improve the reliability of purchases with the group of customers but also reduce the resources expended in servicing the group of customers (e.g., marketing, shipping, communications with customers, and the like). The analytics engine 132 may also simplify for merchants the process of identifying subscription opportunities, as well as the number of dimensions to be determined by the merchant or customer relating to a subscription opportunity. For example, the analytics engine 132 may automatically determine the optimal frequency for delivery for a subscription of a bundle of products to minimize the shipping costs for the merchant. In this manner, the subscription options presented to merchants and customers may be greatly simplified, avoiding the need for detailed manual customization by merchants and customers.

In embodiments, a bundle or subscription may also be presented to or in association with a group of merchants, such as presenting different products from different merchants where the different merchants have the option to opt-in to the offer. In embodiments, products amongst merchants may be combined that complement each other in a non-competitive way, such as where similar products from different merchants don't pit merchants against one another in a competitive fashion. For example, a recommendation from a group of merchants may include one product from a first merchant and a second product from second merchant in a 'venue offer '. In embodiments, building a recommendation involving a group of merchants may be through the group of merchants working together (e.g., where the e-commerce platform initiated the idea for the subscription through a recommendation), where the e-commerce platform 100 builds the recommendation in its entirety for presentation to the group of merchants, or through a blended process where the merchants work with the e-commerce platform 100 to build the recommendation (e.g., through the user interface with the analytics engine 132). The recommendation may then be presented to a customer. Further, the recommendation may be offered to a group of customers, such as where a group of customers may have more purchasing power when buying together.

Commerce behavior patterns may be detected through patterns in an individual customer's purchases, patterns in a group of customers' purchases, patterns in customer purchases across the e-commerce platform 100, patterns in what an individual merchant is selling, patterns in what is selling across different merchants, patterns in what a merchant is purchasing for sale and/or across the supply chain of the merchant, patterns in a group of merchants' purchases, patterns of what merchants are buying and/or selling across the e-commerce platform 100, and the like. For instance, detecting patterns in an individual customer's purchases and the like (or for similar users) may be used to offer subscriptions for that user, such as based on direct purchases or on how the customer responds to product recommendations from the e-commerce platform 100, based on certain purchase patterns over a time period (e.g., purchases made over a couple of days (e.g., buying a second identical product after two days) may not be reason to generate a recommendation, but purchases every three months may.

Commerce behavior patterns may be detected by the analytics engine 132 through patterns in merchant behavior, such as in detecting patterns in what an individual merchant is selling, where a merchant may be informed of potential recommendations for customers related to the merchant's detected behavior patterns. The analytics engine 132 may also consider data from other merchants and sources, as well as from client behavior with respect to the merchant, such as based on direct purchases by customers or on how the customer responds to product recommendations. Patterns may also be detected based on what is selling across different merchants, such as a specific group of merchants, across all merchants of the e-commerce platform 100, and the like. Merchant-based pattern detection may be based on various merchant parameters, such as sales (e.g., past sales, current sales volume, projected sales), product availability, product inventory, product catalogs, reputation (e.g., on social media, industry ratings, and the like), location of products (e.g., physical locations for manufacturers, warehousing, and the like), product fulfillment (e.g., whether the sale was fulfilled through the e-commerce platform), and the like. Patterns in merchant behavior may include what the merchant is purchasing, stocking (e.g., volume of product on hand), as well as product aspects along the supply chain for the merchant, and the like. Patterns for groups of merchants may also be evaluated, where in embodiments, merchant and customer data from across the e-commerce platform 100 may be made anonymous, such as to maintain data insulation between merchants.

Customer and merchant behavior may be tracked based on product purchase/sales behavior, residence/business address, mobile usage, geography, demographics, and the like, such as for individuals or groups of customers and merchants. In embodiments, a user may be required to approve tracking in order to allow the e-commerce platform 100 to use information in determining behavior patterns. In embodiments, tracking (such as with the permission of the user) may extend beyond the bounds of the e-commerce platform 100, such as to third-party commerce providers, shipping providers, payment providers, and the like. In embodiments, tracking customer and merchant behavior may be provided, including whether tracking is with knowledge of the customer or merchant for consideration of subscription analysis, such as tracking for individual customers or groups of customers, tracking for individual merchants, tracking across merchants for related products (e.g., when a group of merchants have agreed to collaborate), tracking without the merchant's knowledge, and the like. For instance building a group merchant offer may be based on detected patterns across a group of merchants that have agreed to collaborate, such where the offer targets an individual customer, a group of customers, class of customers, and the like.

Product subscriptions may be presented to a merchant through a recommendation engine, such as based on any of the patterns listed herein, targeting best customers (e.g. to systematize the purchases from regular customers, which in turn help keep them as customers), making the satisfied customer even more satisfied, targeting new or occasional customers (e.g., to help capture them as repeat customers, or make an occasional customer a more regular customer), and the like.

A recommendation may have offer characteristics, such as with respect to composition of products (e.g., multiple products from a merchant or multiple products from multiple merchants), frequency at which the subscription products are supplied (e.g., one item for one time, one item for multiple times, a bundle for one time, or a bundle for multiple times), duration over which a subscription is provided (e.g., a set term, such as a minimum term to get a certain price or an expected end date, or until the subscription is cancelled), time correlation (e.g., relating time of purchase between at least two products), and the like. A group of products presented in a recommendation may be bundled as related products, such as grouped by product type, product theme, usage profile, usage characteristic, and the like. Alternately, a group of products may be only loosely related, such as not being related other than by the fact that there was some advantage to bringing them together in connection with the surface, such as by a particular consumer or more generally. The analytics engine 132 may determine a composition of products for a recommendation, and initially make the recommendation to a merchant, such as where the merchant could send the recommendation to a customer with a note, such as "Here are some other products that may be useful based on patterns with respect to past purchases." Bundled products may include a thematic grouping, such as with some common link (e.g., being in a category or for a particular surface, and the like).

In embodiments, the e-commerce platform 100 may provide services related to the building and offering of recommendations, such as offering guarantees to merchants related to sales of a presented recommendation (e.g., guarantees for sales over a period of time, such as guaranteeing a product at a discounted price 'x' to sell 'y' units by date 'z' where the merchant agrees to related fulfillment obligations, fulfillment commitment options, and the like), insurance (e.g., presenting guarantees in the form of insurance), providing recommendations directly to customers, determining an optimal location for product warehousing (e.g., based on geolocation commerce patterns), and the like. For instance, the e-commerce platform 100 may build and offer recommendations based on analytics and offer them to users, such as offering them through a sales application directly to customers (e.g., in a one-time sale to take advantage of detected commerce patterns, such as geographically pre-stocking a product in a warehouse for availability in a flash sale to optimize a distribution characteristic).

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer-implemented method comprising:
receiving at an e-commerce platform three-dimensional feature data from augmented reality software on a customer computing device, the three-dimensional feature data identifying a physical surface and determined using the augmented reality software and an imaging device operated by the customer computing device in a customer environment comprising the physical surface;
determining, based on the three-dimensional feature data, surface dimensions of the physical surface;
selecting, with a recommendation engine of the e-commerce platform, a first surface item and a second surface item to be positioned upon the physical surface and visualized by the customer computing device using the augmented reality software, the selecting based at least in part on the determined surface dimensions of the physical surface and dimensional data of each of the first surface item and the second surface item;
determining a positioning of the first surface item and the second surface item upon the physical surface based on the determined surface dimensions, the dimensional data of the first surface item and the second surface item, and one or more rules defining a rule-based spacing for the first surface item and the second surface item, wherein the rule-based spacing determines how the first surface item and the second surface item fit together and scale with the dimensions of the physical surface; and
causing an augmented reality interface to be displayed by the augmented reality software on the customer device, the augmented reality interface comprising an illustrative layout of the physical surface generated using the three-dimensional feature data and showing the determined positioning of the first surface item and the second surface item upon the physical surface in the illustrative layout while imaging the physical surface in the customer environment.

2. The computer-implemented method of claim 1, further comprising the recommendation engine selecting at least one of the first surface item and the second surface item based on a product selection criterion received from the customer computing device.

3. The computer-implemented method of claim 1, further comprising the recommendation engine selecting at least one of the first surface item and the second surface item based on a profile of a customer.

4. The computer-implemented method of claim 1, further comprising the recommendation engine selecting at least one of the first surface item and the second surface item based on past purchase history of a customer.

5. The computer-implemented method of claim 1, further comprising the recommendation engine selecting at least one of the first surface item and the second surface item based on merchant product availability.

6. The computer-implemented method of claim 1, further comprising the recommendation engine selecting at least one of the first surface item and the second surface item based on a merchant profile.

7. The computer-implemented method of claim 1, wherein the first surface item and the second surface item are further associated with a customer subscription offer.

8. The computer-implemented method of claim 1, further comprising determining, based on the surface data, a dimensional layout of the physical surface for the illustrative layout, wherein determining the positioning of the first surface item and the second surface item is further determined through the dimensional layout of the physical surface and how quantities of the first surface item and the second surface item fit on the physical surface.

9. The computer-implemented method of claim 1, wherein determining the positioning of the first surface item and the second surface item is further determined through layout rules for objects on a surface and how the first surface item and the second surface item fit on the physical surface.

10. The computer-implemented method of claim 1, wherein determining the positioning of the first surface item and the second surface item is further determined through a machine learning algorithm based on layout characteristics for objects on a surface and how the first surface item and the second surface item fit on the physical surface.

11. The computer-implemented method of claim 1, further comprising determining at least one of a size or scale for the first surface item and the second surface item in determining how the first surface item and the second surface item fit together and scale with the dimensions of the physical surface.

12. The computer-implemented method of claim 1, further comprising generating the illustrative layout of the physical surface comprising determined quantities of each of the first surface item and the second surface item positioned on the physical surface.

13. The computer-implemented method of claim 1, wherein the illustrative layout comprises an image that is determined through use of the three-dimensional feature data related to at least one of the physical surface, the first surface item, and the second surface item.

14. The computer-implemented method of claim 1, wherein the rule-based spacing specifies an equal spacing between the first surface item and the second surface item.

15. The computer-implemented method of claim 1, wherein the rule-based spacing specifies a minimum space around the first surface item and the second surface item.

16. The computer-implemented method of claim 1, wherein the rule-based spacing specifies a centering relationship with items relative to the physical surface.

17. A system comprising:
an e-commerce platform comprising at least one processor and at least one memory, the e-commerce platform configured to:
receive at an e-commerce platform three-dimensional feature data from augmented reality software on a customer computing device, the three-dimensional feature data identifying a physical surface and determined using the augmented reality software and an imaging device operated by the customer computing device in a customer environment comprising the physical surface;
determine, based on the three-dimensional feature data, surface dimensions of the physical surface;

select, with a recommendation engine of the e-commerce platform, a first surface item and a second surface item to be positioned upon the physical surface and visualized by the customer computing device using the augmented reality software, the selecting based at least in part on the determined surface dimensions of the physical surface and dimensional data of each of the first surface item and the second surface item;

determine a positioning of the first surface item and the second surface item upon the physical surface based on the determine surface dimensions, the dimensional data of the first surface item and the second surface item, and one or more rules defining a rule-based spacing for the first surface item and the second surface item, wherein the rule-based spacing determines how the first surface item and the second surface item fit together and scale with the dimensions of the physical surface; and cause an augmented reality interface to be displayed by the augmented reality software on the customer device, the augmented reality interface comprising an illustrative layout of the physical surface generated using the three-dimensional feature data and showing the determined positioning of the first surface item and the second surface item upon the physical surface in the illustrative layout while imaging the physical surface in the customer environment.

18. The system of claim 17, the e-commerce platform further configured to determine, based on the surface data, a dimensional layout of the physical surface for the illustrative layout, wherein determining the positioning of the first surface item and the second surface item is further determined through the dimensional layout of the physical surface and how the first surface item and the second surface item fit on the physical surface.

19. The system of claim 17, wherein determining the positioning of the first surface item and the second surface item is further determined through layout rules for objects on a surface and how the first surface item and the second surface item fit on the physical surface.

20. The system of claim 17, wherein determining the positioning of the first surface item and the second surface item is further determined through a machine learning algorithm based on layout characteristics for objects on a surface and how the first surface item and the second surface item fit on the physical surface.

\* \* \* \* \*